United States Patent
Ramaswamy et al.

(10) Patent No.: US 12,244,598 B2
(45) Date of Patent: Mar. 4, 2025

(54) SYSTEM AND METHOD FOR SYSTEM ACCESS CREDENTIAL DELEGATION

(71) Applicant: VERIZON PATENT AND LICENSING INC., Basking Ridge, NJ (US)

(72) Inventors: Suresh Ramaswamy, Westford, MA (US); Sameh El-Gawady, Waltham, MA (US); Praveen Kumar Velanati, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 478 days.

(21) Appl. No.: 17/536,212

(22) Filed: Nov. 29, 2021

(65) Prior Publication Data

US 2023/0171257 A1    Jun. 1, 2023

(51) Int. Cl.
*H04L 29/06* (2006.01)
*H04L 9/40* (2022.01)

(52) U.S. Cl.
CPC .................. *H04L 63/102* (2013.01)

(58) Field of Classification Search
CPC ... H04L 63/102; H04L 63/08; H04L 63/0807; H04L 63/0815; H04L 63/0884; H04L 63/10
See application file for complete search history.

(56) References Cited

U.S. PATENT DOCUMENTS

| | | | | |
|---|---|---|---|---|
| 9,521,144 | B2 * | 12/2016 | Matsugashita | H04L 63/0884 |
| 11,824,856 | B1 * | 11/2023 | Sharma | H04L 9/3213 |
| 2003/0145223 | A1 * | 7/2003 | Brickell | G06Q 20/3821 |
| | | | | 726/10 |
| 2006/0206932 | A1 * | 9/2006 | Chong | H04L 63/0807 |
| | | | | 726/10 |
| 2015/0178725 | A1 * | 6/2015 | Poetsch | G06Q 20/3572 |
| | | | | 705/44 |
| 2022/0020023 | A1 * | 1/2022 | Ju | G06Q 20/4014 |

* cited by examiner

*Primary Examiner* — Harunur Rashid

(57) ABSTRACT

Disclosed are systems and methods that provide a framework that enables user to delegate other users as operators of their securely held account credentials via services backed by OAuth protocols. The disclosed framework provides functionality for users to be delegated access to other users' account credentials, information and resources for the performance of specific electronic transactions. The framework operates by connecting two OAuth registered users so that one user can perform an electronic transaction using another user's securely held credentials upon approval by the other user. This ensures that each electronic transaction is securely held and performed, and operated under the control of the delegator despite performance of the transaction by the delegatee involving the delegator's account information.

17 Claims, 8 Drawing Sheets

SYSTEM AND METHOD FOR SYSTEM ACCESS CREDENTIAL DELEGATION

BACKGROUND

OAuth (Open Authorization) is an open standard for access delegation that is commonly used as a way for users to grant websites and applications access to their information.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Figure 1:
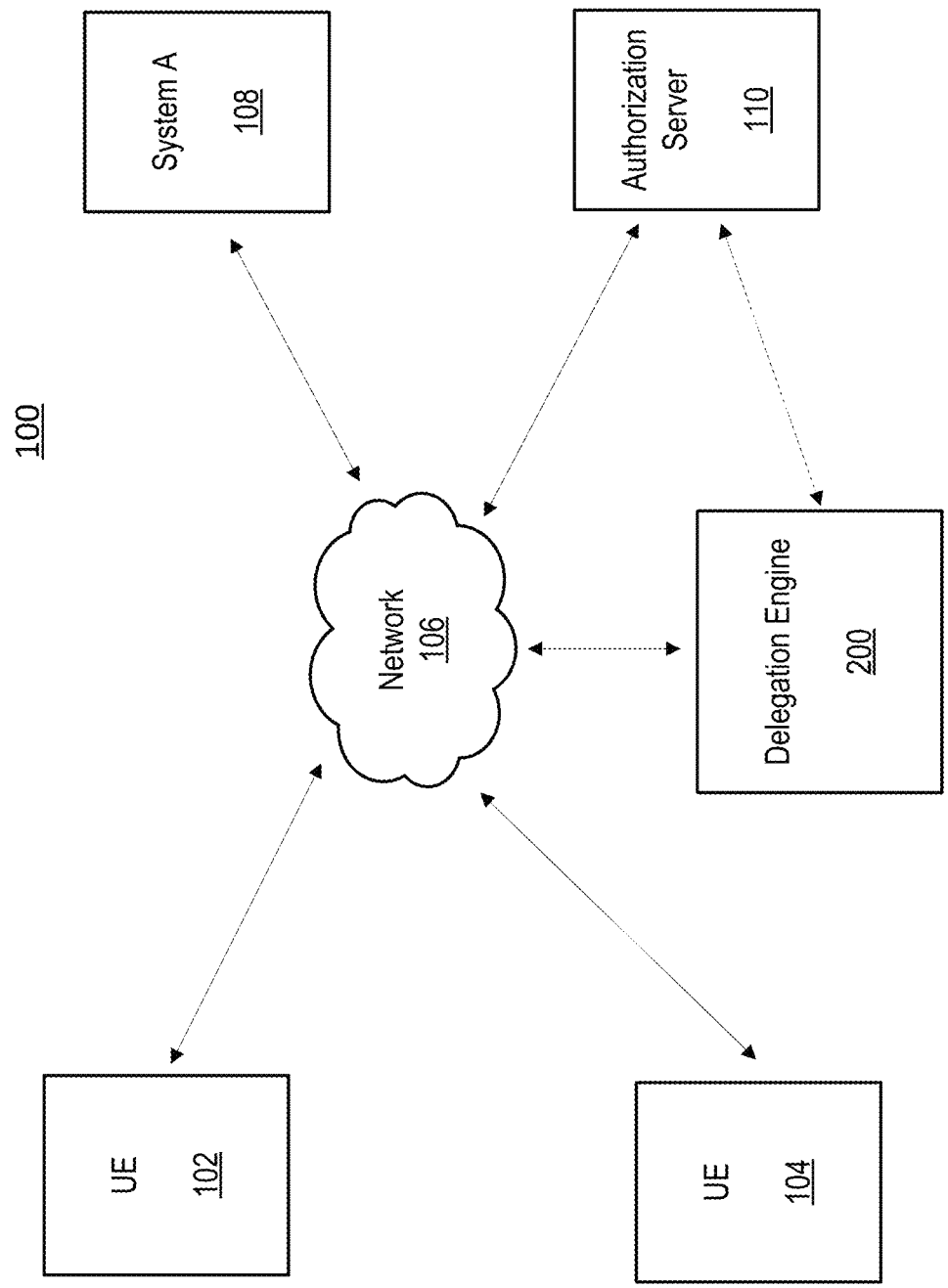
FIG. 1 is a block diagram of an example configuration within which the systems and methods disclosed herein could be implemented according to some embodiments of the present disclosure.

OAuth has enabled applications that manage and protect user's identity, such as, for example, ZenKey®, to securely offer authentication services and identity verification for the performance of electronic transactions. Current forms of these existing applications and services enable a third party application to access account information or resources of a user from a resource server upon consent provided by the user via an authorization server.

The disclosed systems and methods provide a framework that expands the scope of existing authentication and identification verification services by enabling users to delegate other users as operators of their securely held account credentials. This, therefore, enables users to act on the basis of other user's credentials.

By way of a non-limiting example, user Bob works at Company X, and Jane is his boss. Bob is travelling for work, and the airfare was purchased via Jane's company credit card. Recent events on Bob's work trip have caused to him to have to travel to another city for purposes of completing the trip (e.g., has to visit another factory that has been identified as the cause of issues with the company's product). Bob, therefore, needs to purchase tickets to the other city; however, he does not have access to the company credit card, and is not an authorized user (Jill is).

Under current deployments of OAuth protocol (e.g., OAuth 2.0), using OpenID®, for example, only Jill has securely enabled access to the credit card's account information, and not Bob. Therefore, under current protocols, Bob would be required to use his card.

However, the disclosed framework provides technological advancements that enable Bob to be delegated access to Jill's card. The framework can invoke OAuth protocol to request access to Jill's credit card account information, which upon approval by Jill, enables Bob the capability to charge specific purchases to Jill's card on a transactional basis. Non-limiting examples and embodiments of this scenario, and others, are discussed in detail below in relation to FIGS. 3-4C.

Therefore, the disclosed systems and methods provide functionality for users to be delegated access to other users' account credentials, information and resources. In some embodiments, the delegation can be for specific transactions. In some embodiments, the delegation can also or alternatively be for a period of time, tied to a geographic location, for types of transactions, for amounts or amount ranges, and the like, or some combination thereof.

In some embodiments, as discussed below, delegation can be in relation to performing an electronic transaction (e.g., purchase an item), accessing an application, accessing an account, a website or web portal, and/or downloading, uploading and/or consuming content, and the like. Thus, the disclosed framework can enable one user to access information, account data, resources, content, and the like, that is protected for use by another user via delegation by the other user according to the disclosed systems and methods discussed herein.

According to some embodiments, for purposes of the discussion of the disclosed framework's configuration, operation and implementation, OAuth protocol will be understood to have been already established. That is, the user requesting access (e.g., delegatee) to another user's information, and the other user approving access (e.g., delegator) are established authorized users under OAuth protocol. For example, each user can have an account for an identity or authorization application set up that enables the disclosed delegation to transpire according to the following disclosure. In other words, the required tokens, PINs and authorization codes have been exchanged with the required server(s) (e.g., authorization server 110, as discussed below), which enables the delegation processing discussed herein to occur.

With reference to FIG. 1, system 100 is depicted which includes user equipment (UE) 102, UE 104, network 106, system 108, authorization server 110 and delegation engine 200. UEs 102 and 104 can be any type of device, such as, but not limited to, a mobile phone, tablet, laptop, sensor, Internet of Things (IoT) device, autonomous machine, and any other device equipped with a cellular or wireless or wired transceiver. In some embodiments, UE 102 can correspond to a device of one user, and UE 104 can correspond to a device of another user. For example, the user of UE 102 can be a delegatee, and the user of UE 104 can be the delegator, and vice versa. Further discussion of UEs 102 and 104 are provided below in reference to FIG. 5.

Network 106 can be any type of network, such as, but not limited to, a wireless network, cellular network, the Internet, and the like. Network 106 facilitates connectivity of the components of system 100, as illustrated in FIG. 1. A further discussion of the network configuration and type of network is provided below in reference to FIG. 6.

System 108 can be any type of cloud operating platform and/or network based system upon which applications, operations, and/or other forms of network resources can be located and access from. For example, system 108 can be a resource server, a service provider and/or network provider from where applications can be accessed, sourced or executed from (e.g., a user's email account).

By way of a non-limiting example, using the example from above, Bob can be associated with UE 102, and Jill can be associated with UE 104. Bob can be requesting access to the credit card account information of Jill that is housed by system 108 (e.g., system 108 represents a credit card company providing Jill's card).

In some embodiments, system 108 can include a server(s), an application(s) and/or a database of information which is accessible over network 106. In some embodiments, a database (not shown) of system 108 can store a dataset of data and metadata associated with local and/or network information related to user(s) of UE 102 and/or UE 104, and the devices themselves, and the services, applications, content rendered and/or executed by UEs 102 and/or 104.

In some embodiments, authorization server 110 can be associated with OAuth protocol upon which the delegation engine 200 can operate. That is, authorization server 110 can be a component of OAuth protocol that facilitates the securely held account information in system 108 to be accessed by a delegated user (via UE 102 or 104). As discussed in more detail below in relation to at least FIG. 3, authorization server 110 can exchange authorization codes for access tokens and facilitate delegation of the account information (e.g., in system 108) to the delegatee.

Delegation engine 200, as discussed above, includes components for performing the delegation of account information between delegators and delegatees. Delegation engine 200 can be a special purpose machine or processor and could be hosted by authorization server 110 (e.g., as indicated by the dashed line between engine 200 and server 110 in FIG. 1).

In some embodiments, delegation engine 200 can be hosted by a device on the network 106 (e.g., UE 102 and/or UE 104), by system 108, another server or device on the network 106 (not shown), and the like. In some embodiments, delegation engine 200 can be configured and/or installed as a stand-alone application, or an augmenting script, program or application (e.g., a plug-in or extension) to another application or program executing on a hosting device(s). For example, delegation engine 200 can be configurated as an application being executed by UE 102/104.

Figure 2:
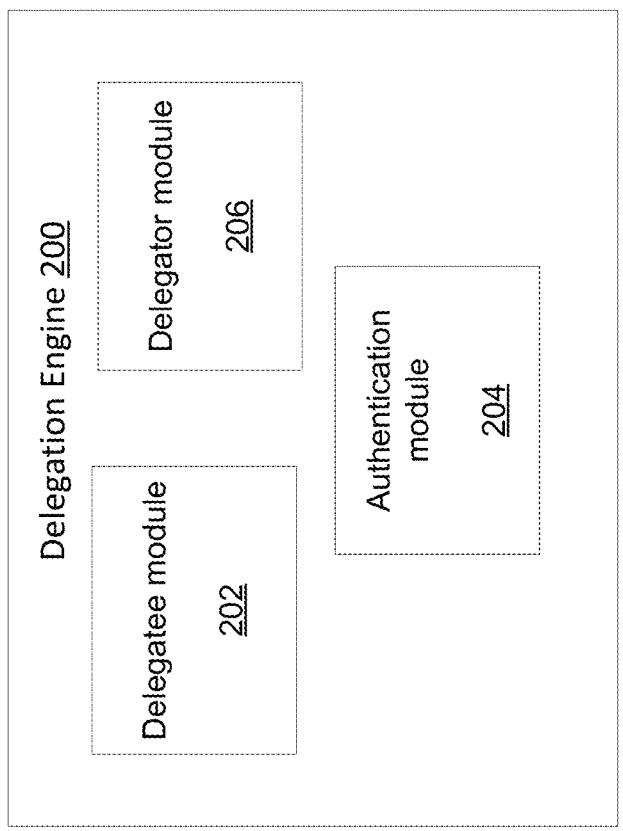
FIG. 2 is a block diagram illustrating components of an exemplary system according to some embodiments of the present disclosure.

As illustrated in FIG. 2, according to some embodiments, delegation engine 200 includes delegatee module 202, authentication module 204 and delegator module 206, as illustrated in FIG. 2. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below in relation to FIGS. 3-4C.

Figure 3:
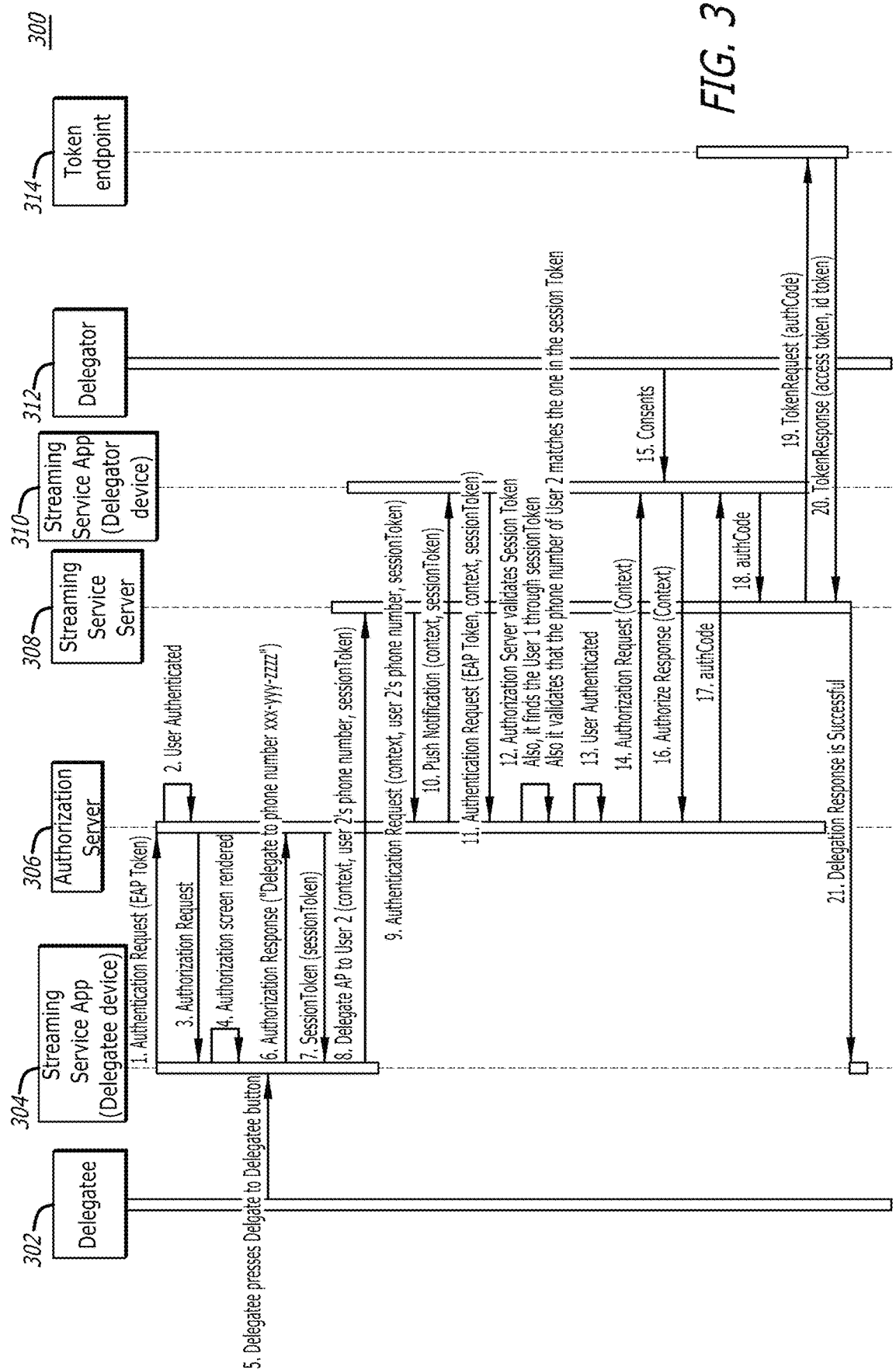
FIG. 3 illustrates an exemplary work flow according to some embodiments of the present disclosure.

FIG. 3 provides a non-limiting example environment 300 of the operations of system 100 from FIG. 1. According to some embodiments, environment 300 involves the processing where a delegator 312 (e.g., a user of UE 104 from FIG. 1) delegates authorization of their account information in system 108 to a delegatee 302 (e.g., a user of UE 102 from FIG. 1).

According to some embodiments and by way of a non-limiting example, the disclosure of FIG. 3 will be with reference to an example embodiment where a father delegates access to his streaming service account (e.g., Amazon Prime®, Netflix®, and the like) to his daughter who is at a friend's house and is attempting to purchase a "paid" movie with credentials from the father's account on the streaming service. It should be understood that this is a non-limiting example, and solely put forth for clarification and explanation purposes.

According to some embodiments, as depicted in FIG. 1, the daughter is operating UE 102, the father is operating UE 104, and the streaming service (e.g., streaming service server and streaming service application ("app")) is represented by system 108. Thus, in FIG. 3, the daughter is the delegatee 302 and the father is the delegator 312.

For example, as discussed in more detail below with reference to Steps 1-21 of FIG. 3, the daughter opens a streaming application hosted by a streaming service server, and logs-in with her account information. Upon logging in, the daughter is able to send a "delegate" request to her father so that she can purchase the movie via account information in the father's account (e.g., the main account under contract). The request can be directed to the father's device and/or the application executing on the father's device based on the input of the father's mobile directory number (MDN) (e.g., phone number) (or other identifier associated with the network service provider or streaming service application, and the like). In some embodiments, the daughter can be prompted to provide the MDN, or like information.

As a result, a delegate message is sent to the streaming service's server. The message contains the MDN of the father and information related to the attempted/requested transaction (e.g., information indicating a purchase the movie for $10.00 dollars). The streaming service server that receives the message sends an authentication request message to the authorization server (e.g., authorization server 306, as depicted in FIG. 3 (which is the same as server 110 from FIG. 1)). The authorization server sends a push notification message to the father's device. When the father receives the message, it can immediately be opened thereby causing the streaming service application to open, or the father can receive the notification which will cause the streaming service application to open after his interaction with it (e.g., taps the notification).

Upon the streaming service application being opened, and after the father logs into his account via his device (e.g., UE 104), the father is authenticated and then he can be presented an authorization screen. The authorization screen asks the father whether he would pay $10.00 to the streaming service for the movie. The father confirms "yes". This consent is sent back to the authorization server. The authorization server returns an access token and ID token back to the streaming service server. The streaming service server debits $10.00 from the father's streaming service account. The streaming service server then responds with a success message (e.g., Hypertext Transfer Protocol (HTTP) 200 OK) back to the daughter's device, which enables and finalizes the purchase of the movie.

Turning to FIG. 3, Steps 1-21 are depicted which disclose the functional steps discussed above as performed by the delegatee 302, streaming service application 304 (operating on the device of the delegatee 302), authorization server 306 (similar to authorization server 110 from FIG. 1), streaming service server 308, streaming service application 310 (operating on the device of the delegator 312), delegator 312 and the token endpoint 314.

According to some embodiments, Steps 1-7 of FIG. 3 can be performed by delegatee module 202 of delegation engine 200; Steps 8-10, 12-14 and 17-21 can be performed by authentication module 204; and Steps 11, 15 and 16 can be performed by delegation module 206.

FIG. 3 involves the non-limiting example embodiment, as discussed above, of a delegator 312 (e.g., father) receiving the notification that a delegatee 302 (e.g., his daughter) is requesting to purchase a movie for $10.00 from a streaming service.

In Step 1, the delegatee 302 requests to purchase an item (e.g., an online movie, for example) via the streaming service application 304 on her device, as discussed above. In Step 1, delegatee 302, via streaming service application 304, sends an authentication request to the authorization server 306 that includes an extensible authentication protocol (EAP) token associated with the delegatee 302 (e.g., attempts to login to her streaming service account). In Step 2, the authorization server 306 receives the request and authenticates based on the EAP. In Step 3, once authenticated, the authorization server 306 sends an authorization request back to the streaming service application 304 on the device of the delegatee 302. In Step 4, the streaming service application 304 receives the message and renders a user interface (UI) screen with an electronic form (as discussed in below in relation to FIGS. 4A-4C). The form enables the compilation and sending of the request for delegation.

In some embodiments, the electronic form can include options including, but not limited to, a context of the electronic transaction, a delegator or listing of predefined delegators, approval of the transaction, decline of the transaction, modification of the transaction, input of an identifier of a delegator, and the like, or some combination thereof.

Continuing with the flow of FIG. 3, in Step 5, the delegatee 302 selects an option approving the electronic transaction and identifying a delegator 312, which involves the generation of an authorization response that can identify the MDN of the delegatee 312 that is selected. In Step 6, the authorization response is sent back to the authorization server 306. In Step 7, the authorization server 306 creates a Session Token. In some embodiments, the Session Token can include, but is not limited to, information about the delegatee 302, the delegator 312, and the context information for authorization (e.g., movie purchase for $10.00, and the like). The authorization server 306 then creates a message with this Session Token and sends the message to the streaming service application 304 on the device of the delegatee 302. In Step 8, the streaming service application 304, after receiving the message in Step 7, sends a delegate message to the streaming service server 308.

In Step 9, upon receiving the delegate message in Step 8, the streaming service server 308 constructs an authentication request with the context information, phone number of the delegator 312 and the Session Token, and directs the message to the authorization server 306.

In Step 10, upon receiving the authentication request in Step 9, the authorization server 306 sends a push notification to a device of the delegator 312. In some embodiments, the push notification can include, but is not limited to, the Session Token and the context information.

In Step 11, the delegator 312 opens the notification and logs into the streaming service application 310 on his/her device. The streaming service application 308 then sends an authentication request including an EAP token of the delegator 312, the context information and Session Token to the authorization server 306. In some embodiments, the EAP token can be sent via functionality associated with a service provider's SDK (software development kit).

In Step 12, upon receiving this authentication request in Step 11, the authorization server 306 validates at least one of, and in some embodiments, a combination of, the Session Token, the phone number of the delegator 312 by matching it with the phone number in the EAP token in the authentication request, account information related to the delegator 312 to ensure that he has delegation authority (e.g., under OAuth protocol), the signature in the Session Token and/or the EAP token in the authentication request.

Once all validations are completed, in Step 13, the authorization server 306 sends an authorization request that includes the context to the streaming service application 308 on the device of the delegator 312. In Step 14, upon receipt of the authentication request in Step 13, the device of the delegator 312 is rendered with a consent form with the context from the context from Step 13.

In Step 15, when the delegator 312 consents to the request from the delegatee 302 (e.g., delegator 312 approves the purchase of the movie by the delegatee 302 via the account of the delegator 312), Step 16 is performed where an authorization response is sent back by the streaming service application 308 to the authorization server 306.

In Step 17, the authorization server 306 creates an authorization code (auth_code) and sends it with a redirection status code (e.g., HTTP 302) to the streaming service application 310 (e.g., account of the delegator 312). The auth_code, indicates the authorization provided by delegator 312. In Step 18, the auth_code is captured by the streaming service application 310 and is sent back to the streaming service server 308 along with a Session Token.

In Step 19, the streaming service server 310 makes a Token Request call, which includes the auth_code) to the Token endpoint 314. In Step 20, the Token endpoint 314, which can be an HTTP endpoint that enables access to and retrieval of access token given a proper authorization code, returns an access token and the ID token to the streaming service server 310. The access token and ID token enable the delegation of account information in the streaming service server 310 (e.g., system 108, from FIG. 1) from the delegator 312 to the delegatee 302 to occur.

In Step 21, the streaming service server 310 responds with a "Delegation Successful" message back to the streaming service application 304 on the device of the delegatee 302, which is in response to the request from Step 8, as discussed above. As discussed above, the "Delegation Successful" message can be a HTTP 200 OK message.

According to some embodiments, the implementation of Steps 1-21 of FIG. 3 can be implemented by a service provider (e.g., Verizon®), which can, among other features, enable the elimination of the reliance on a One Time PIN (OTP). That is, rather than having OTPs sent to user's (e.g., via their email), the delegation technology disclosed herein can be implemented, which provides a more secure and adaptable framework for securely enabling users access to their and other users' credentials. In some embodiments, a service provider can utilize an application (referred to, for example, as "streaming service app", as discussed above in example embodiments in relation to FIG. 3) that enables delegation of account information and credentials across devices and between users, as detailed above.

Figure 4A:
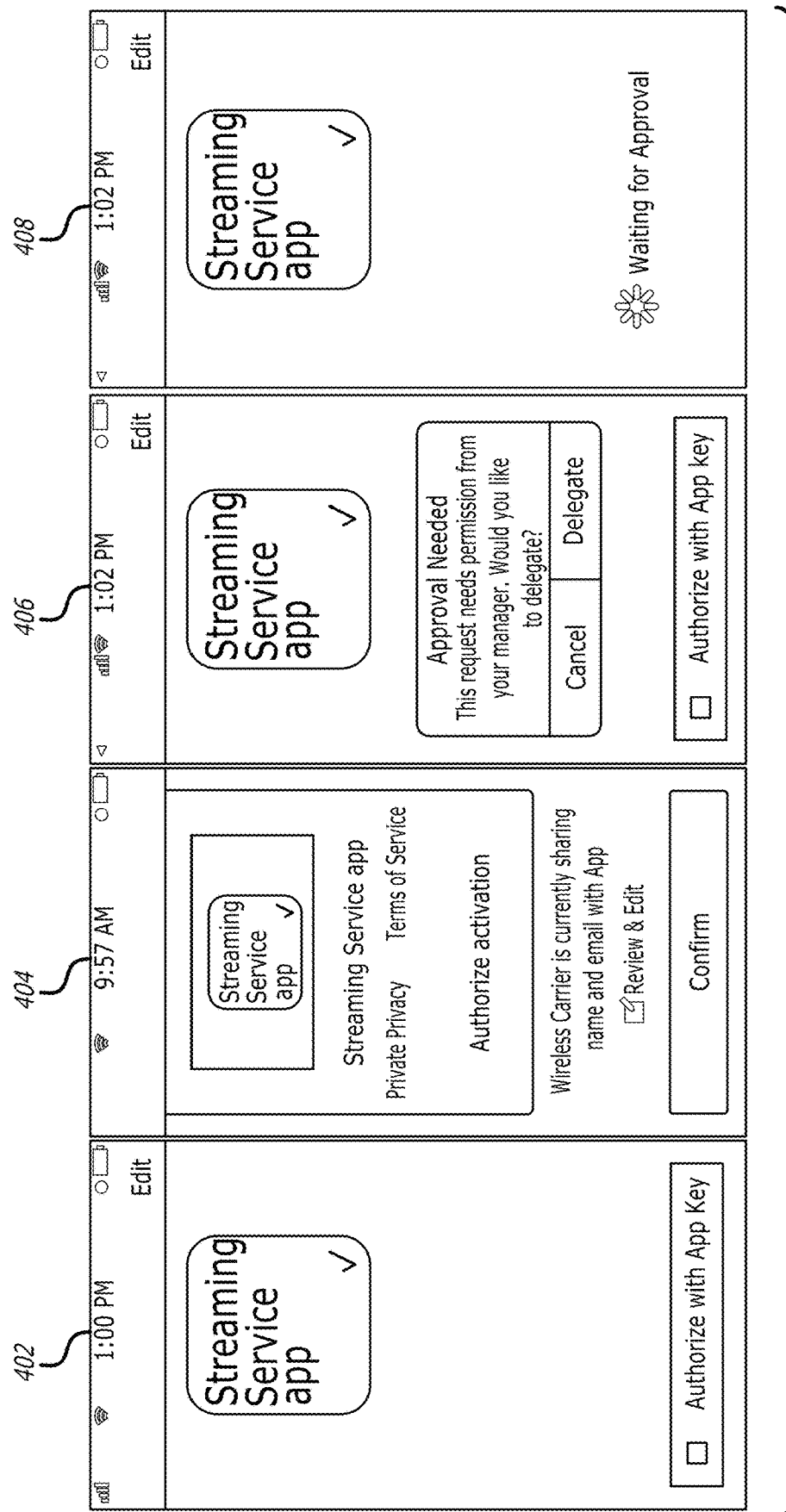
FIGS. 4A-4C illustrate non-limiting example embodiments according to some embodiments of the present disclosure.
Figure 4B:
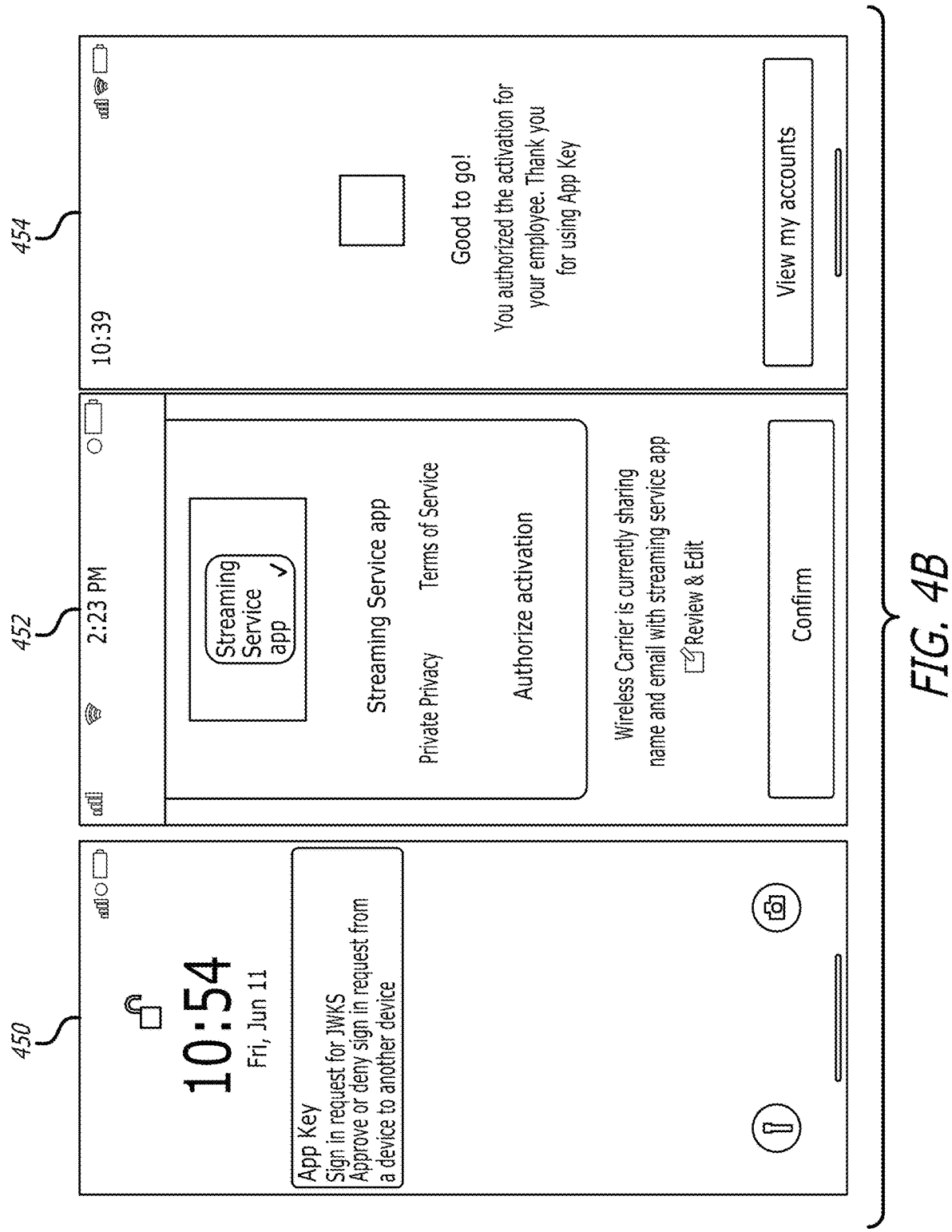
Figure 4C:
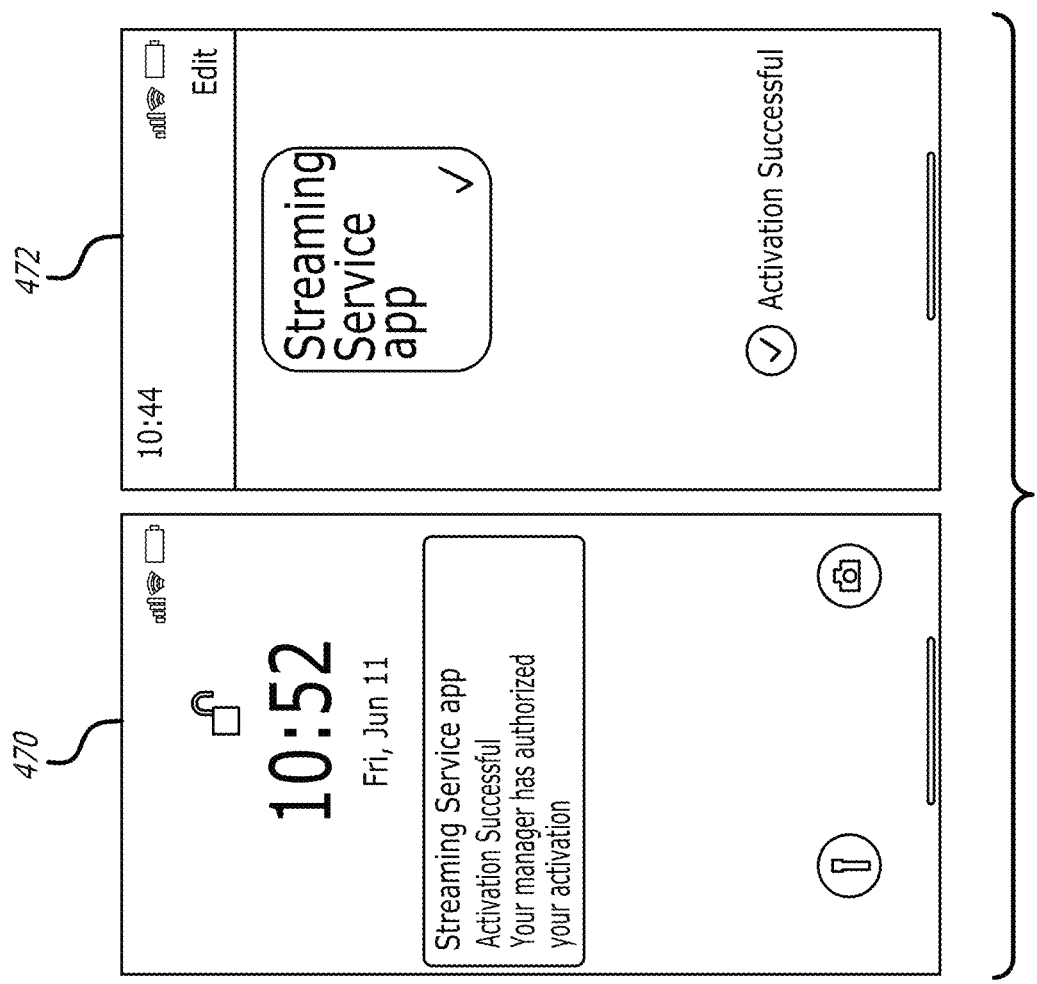

According to some embodiments, as illustrated in FIG. 4A-4C, the disclosed non-limiting embodiments provide examples of operations for delegation, as discussed above in relation to Steps 1-21 of FIG. 3.

In some embodiments, for example, FIG. 4A illustrates user interfaces (UIs) 402-408, which can correspond to an application that enables delegation requests to be sent and processed. In other words, UIs 402-408 provide an example where a user (e.g., delegatee) is authorizing themselves using an identity application (such as, for example, ZenKey®), and requesting delegation from another user (e.g., a delegator).

For example, UI 402, can enable an application, which can be backed by an identity application's functionality, to be executed which enables the delegatee to be authorized (e.g., in a similar manner as discussed above in relation to Step 1 of FIG. 3). UI 404 provides an example interface where authorization via the identity application is established (as discussed above in relation to Steps 2-3 of FIG. 3).

UI 406 provides an example embodiment where the delegatee is requesting to perform a transaction, and is alerted that approval is needed from the delegator. For example, as discussed above in the Father-Daughter example, the daughter is alerted that the Father needs to approve the use of his streaming service account information. And, UI 408 illustrates an example interface that depicts a sample screen a delegatee (e.g., the daughter) can be shown to the delegatee as authorization via the delegator is performed.

In FIG. 4B, UIs 540-452 provide example embodiments of the delegator being notified about a request from the delegatee, and then approving the delegation.

For example, in UI 450, a notification message is provided to the delegator that another user (e.g., a delegatee) is requesting access (e.g., signing in) to an account of the delegator. Upon opening the notification, UI 452 can be displayed which enables the delegator to confirm or authorize the request. And, upon confirmation, a notification can be displayed to the delegator that the authorization was successful, as depicted in UI 454.

In FIG. 4C, UIs 470-472 provide example embodiments of the delegatee being notified that the delegation request was approved by the delegator. For example, UI 470 depicts a notification message that indicates that the delegator has approved the delegation request. And, upon interacting with the notification message, UI 472 can be displayed which provides an interface indicating that activation was successful, and the transaction can be processed as requested by the delegatee. For example, the daughter is approved by the Father, and the movie is made available on the daughter's device for streaming.

Figure 5:
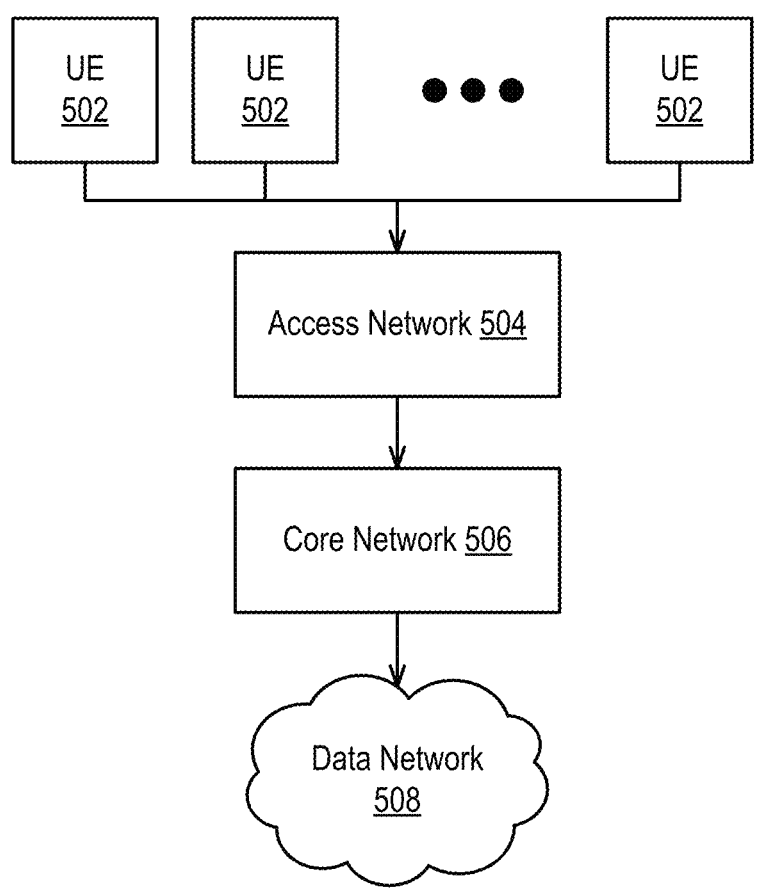
FIG. 5 is a block diagram of an example network architecture according to some embodiments of the present disclosure.

FIG. 5 is a block diagram of an example network architecture according to some embodiments of the present disclosure. In the illustrated embodiment, UE 502 accesses a data network 508 via an access network 504 and a core network 506. In the illustrated embodiment, UE 502 comprises any computing device capable of communicating with the access network 504. As examples, UE 502 may include mobile phones, tablets, laptops, sensors, IoT devices, autonomous machines, unmanned aerial vehicles (UAVs), wired devices, wireless handsets, and any other devices equipped with a cellular or wireless or wired transceiver. One non-limiting example of a UE is provided in FIG. 5.

In the illustrated embodiment of FIG. 5, the access network 504 comprises a network allowing network communication with UE 502. In general, the access network 504 includes at least one base station that is communicatively coupled to the core network 506 and coupled to zero or more UEs 502.

In some embodiments, the access network 504 comprises a cellular access network, for example, a fifth-generation (5G) network or a fourth-generation (4G) network. In one embodiment, the access network 504 can comprise a Next-Gen Radio Access Network (NG-RAN), which can be communicatively coupled to UE 502. In an embodiment, the access network 504 may include a plurality of base stations (e.g., eNodeB (eNB), gNodeB (gNB)) communicatively connected to UE 502 via an air interface. In one embodiment, the air interface comprises a New Radio (NR) air interface. For example, in a 5G network, UE 502 can be communicatively coupled to each other via an X2 interface, and in some embodiments, for example, such coupling can be via Wi-Fi functionality, Bluetooth, or other forms of spectrum technologies, and the like.

In the illustrated embodiment, the access network 504 provides access to a core network 506 to the UE 502. In the illustrated embodiment, the core network may be owned and/or operated by a network operator (NO) and provides wireless connectivity to UE 502 via access network 504. In the illustrated embodiment, this connectivity may comprise voice and data services.

At a high-level, the core network 506 may include a user plane and a control plane. In one embodiment, the control plane comprises network elements and communications interfaces to allow for the management of user connections and sessions. By contrast, the user plane may comprise network elements and communications interfaces to transmit user data from UE 502 to elements of the core network 506 and to external network-attached elements in a data network 508 such as, but not limited to, the Internet, a local area network (LAN), a wireless LAN, a wide area network (WAN), a mobile edge computing (MEC) network, a private network, a cellular network, and the like.

In the illustrated embodiment, the access network 504 and the core network 506 may be operated by a NO. However, in some embodiments, the networks (504, 506) may be operated by a private entity, different entities, and the like, and may be closed to public traffic. In these embodiments, the operator of the device can simulate a cellular network, and UE 502 can connect to this network similar to connecting to a national or regional network.

Figure 6:
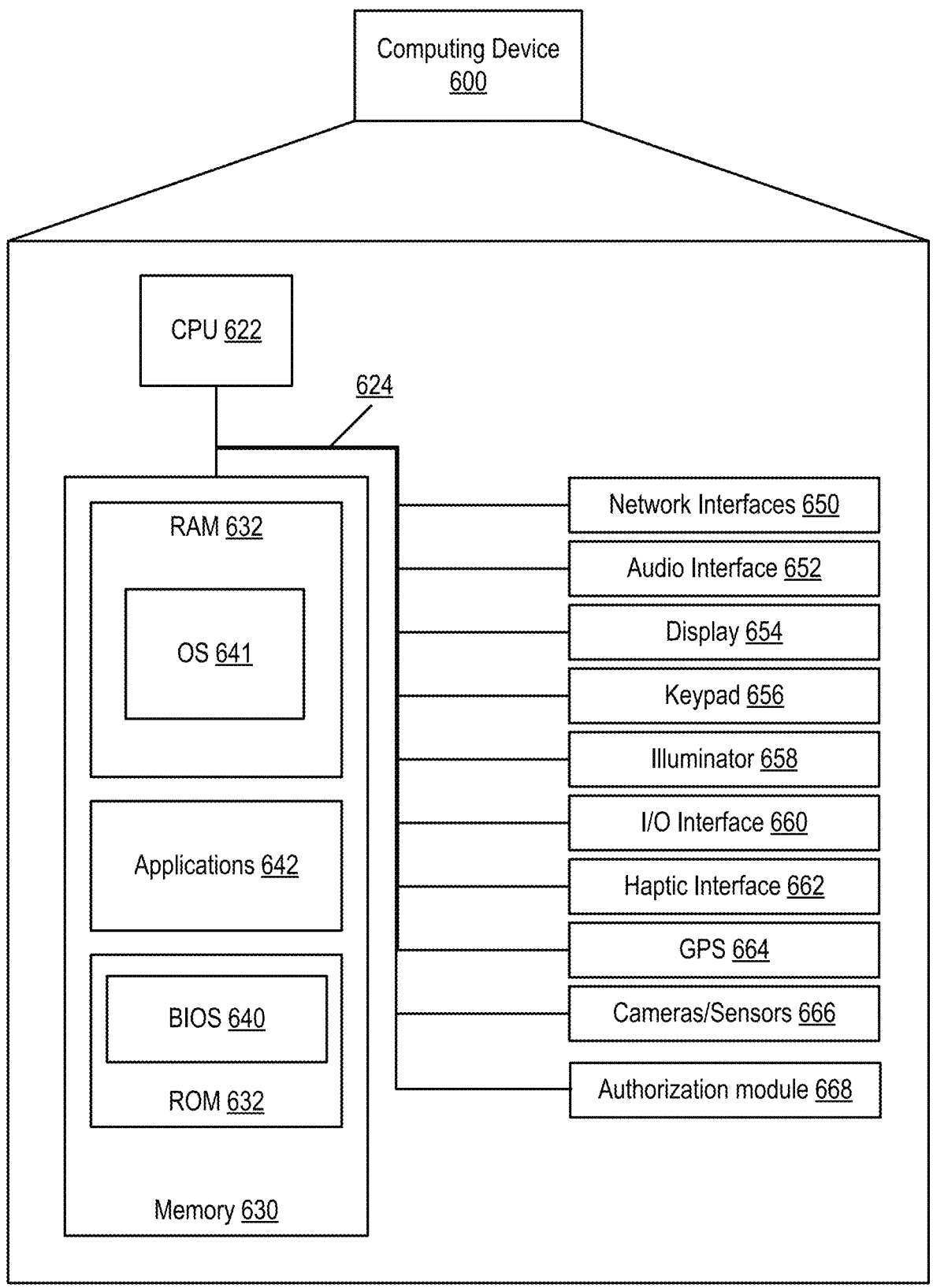
FIG. 6 is a block diagram illustrating a computing device showing an example of a client or server device used in various embodiments of the present disclosure.

FIG. 6 is a block diagram illustrating a computing device 600 showing an example of a client or server device used in the various embodiments of the disclosure. Computing device 600 can be a representation of UEs 102, 104 and 502, as mentioned above.

The computing device 600 may include more or fewer components than those shown in FIG. 6, depending on the deployment or usage of the device 600. For example, a server computing device, such as a rack-mounted server, may not include audio interfaces 652, displays 654, keypads 656, illuminators 658, haptic interfaces 662, GPS receivers 664, cameras/sensors 666, and/or authorization module(s) 668. Some devices may include additional components not shown, such as graphics processing unit (GPU) devices, cryptographic co-processors, artificial intelligence (AI) accelerators, SIM cards, or other peripheral devices.

As shown in FIG. 6, the device 600 includes a central processing unit (CPU) 622 in communication with a mass memory 630 via a bus 624. The computing device 600 also includes one or more network interfaces 650, an audio interface 652, a display 654, a keypad 656, an illuminator 658, an input/output interface 660, a haptic interface 662, an optional GPS receiver 664 (and/or an interchangeable or additional GNSS receiver) and a camera(s) or other optical, thermal, or electromagnetic sensors 666. Device 600 can include one camera/sensor 666 or a plurality of cameras/sensors 666. The positioning of the camera(s)/sensor(s) 666 on the device 600 can change per device 600 model, per device 600 capabilities, and the like, or some combination thereof.

In some embodiments, the device 600 can include an authorization module 668. According to some embodiments, the authorization module 668 can function to generate and/or process EAP tokens, auth_codes, and/or any other type of device specific authentication that provides a form of identity verification and/or verifies/confirms approval of delegation, as discussed above. In some embodiments, module 668 can operate in accordance with an identity application executing via application component 642.

In some embodiments, the CPU 622 may comprise a general-purpose CPU. The CPU 622 may comprise a single-core or multiple-core CPU. The CPU 622 may comprise a system-on-a-chip (SoC) or a similar embedded system. In some embodiments, a GPU may be used in place of, or in combination with, a CPU 622. Mass memory 630 may comprise a dynamic random-access memory (DRAM) device, a static random-access memory device (SRAM), or a Flash (e.g., NAND Flash) memory device. In some embodiments, mass memory 630 may comprise a combination of such memory types. In one embodiment, the bus 624 may comprise a Peripheral Component Interconnect Express (PCIe) bus. In some embodiments, the bus 624 may comprise multiple busses instead of a single bus.

Mass memory 630 illustrates another example of computer storage media for the storage of information such as computer-readable instructions, data structures, program modules, or other data. Mass memory 630 stores a basic input/output system ("BIOS") 640 for controlling the low-level operation of the computing device 600. The mass memory also stores an operating system 641 for controlling the operation of the computing device 600.

Applications 642 may include computer-executable instructions which, when executed by the computing device 600, perform any of the methods (or portions of the methods) described previously in the description of the preceding Figures. In some embodiments, the software or programs implementing the method embodiments can be read from a hard disk drive (not illustrated) and temporarily stored in RAM 632 by CPU 622. CPU 622 may then read the software or data from RAM 632, process them, and store them to RAM 632 again.

The computing device 600 may optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 may be coupled to a speaker and microphone (not shown) to enable telecommunication with others or generate an audio acknowledgment for some action. Display 654 may be a liquid crystal display (LCD), gas plasma, light-emitting diode (LED), or any other type of display used with a computing device. Display 654 may also include a touch-sensitive screen arranged to receive input from an object such as a stylus or a digit from a human hand.

Keypad 656 may comprise any input device arranged to receive input from a user. Illuminator 658 may provide a status indication or provide light.

The computing device 600 also comprises an input/output interface 660 for communicating with external devices, using communication technologies, such as USB, infrared, Bluetooth™, or the like. The haptic interface 662 provides tactile feedback to a user of the client device.

The optional GPS transceiver 664 can determine the physical coordinates of the computing device 600 on the surface of the Earth, which typically outputs a location as latitude and longitude values. GPS transceiver 664 can also employ other geo-positioning mechanisms, including, but not limited to, triangulation, assisted GPS (AGPS), E-OTD, CI, SAI, ETA, BSS, or the like, to further determine the physical location of the computing device 600 on the surface of the Earth. In one embodiment, however, the computing device 600 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/ acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
receiving, by a server, a request from a device of a first user for the first user to perform electronic activity with an electronic entity, the electronic activity of the first user requiring account credential information of an account of a second user, the request including identifying information of the second user;
compiling, by the server, an authorization request to be sent to a device of the second user for authorization of the request from the first user, the authorization request including the identifying information of the second user, information indicating a context of the request from the first user, and a session token, wherein the authorization request is communicated to the device of the second user as a push message;
communicating, by the server, the authorization request to the device of the second user via a push notification;
receiving, by the server, in response to the authorization request, information related to consent by the second user for the first user to perform the activity;
communicating, by the server, an authorization code related to the consent, the authorization code being sent to the device of the second user, the first user and the electronic entity;
delegating authority, by the server, to the first user to act as an authorized user of the account credential information of the second user for the electronic activity; and
facilitating, by the server, the electronic activity based on the delegated authority via an access token accessible using the authorization code.

2. The method of claim 1, further comprising:
creating, by the server, an authorization code based on the consent information; and
compiling, by the server, a message comprising the authorization code and a redirection message to the account of the second user.

3. The method of claim 2, further comprising:
performing, by the server, a token request call to a token endpoint based on the compiled message, the token endpoint comprising access tokens for enabling authority delegation of the account credential information of the second user to the first user; and
identifying, by the server, an access token, wherein the access token enables the authority delegation to the first user.

4. The method of claim 1, further comprising:
receiving, by the server, information identifying the second user and a context of the request from the first user, the context comprising information indicating the activity of the first user; and
performing the compilation of the authorization request based on the received information.

5. The method of claim 4, wherein the information identifying the second user comprises a Mobile Directory Number (MDN) of the second user.

6. The method of claim 1, wherein the authorization request is caused to be displayed as a notification on a display of the device of the second user.

7. The method of claim 1, further comprising:
identifying, by the server, a successful login to the account of the second user by the second user, wherein the consent information is enabled to be received based on the successful login.

8. The method of claim 1, further comprising:
receiving, by the server, a login request from the first user to login to an account of the first user, the account of the first user being provided by a same provider of the account of the second user; and
confirming, by the server, a login of the first user.

9. The method of claim 1, wherein the electronic activity corresponds to one of purchasing an item, accessing an application, accessing an account, accessing a website, accessing a web portal, downloading content, uploading content and consuming content.

10. A server comprising:
a processor configured to:
receive a request from a device of a first user for the first user to perform electronic activity with an electronic entity, the electronic activity of the first user requiring account credential information of an account of a second user, the request including identifying information of the second user;

compile an authorization request to be sent to a device of the second user for authorization of the request from the first user, the authorization request including the identifying information of the second user, information indicating a context of the request from the first user, and a session token, wherein the authorization request is communicated to the device of the second user as a push message;

communicate the authorization request to the device of the second user via a push notification;

receive, in response to the authorization request, information related to consent by the second user for the first user to perform the activity;

communicate an authorization code related to the consent, the authorization code being sent to the device of the second user, the first user and the electronic entity;

delegate authority to the first user to act as an authorized user of the account credential information of the second user for the electronic activity; and facilitate the electronic activity based on the delegated authority via an access token accessible using the authorization code.

11. The server of claim 10, further comprising:

create an authorization code based on the consent information;

compile a message comprising the authorization code and a redirection message to the account of the second user;

performing a token request call to a token endpoint based on the compiled message, the token endpoint comprising access tokens for enabling authority delegation of the account credential information of the second user to the first user; and identify an access token, wherein the access token enables the authority delegation to the first user.

12. The server of claim 10, further comprising:

receive information identifying the second user and a context of the request from the first user, the context comprising information indicating the activity of the first user, the information identifying the second user comprises a Mobile Directory Number (MDN) of the second user; and perform the compilation of the authorization request based on the received information.

13. The server of claim 10, further comprising:

identify a successful login to the account of the second user by the second user, wherein the consent information is enabled to be received based on the successful login.

14. A non-transitory computer-readable medium tangibly encoded with instructions, that when executed by a processor of a server, perform a method comprising:

receiving, by the server, a request from a device of a first user for the first user to perform electronic activity with an electronic entity, the electronic activity of the first user requiring account credential information of an account of a second user, the request including identifying information of the second user;

compiling, by the server, an authorization request to be sent to a device of the second user for authorization of the request from the first user, the authorization request including the identifying information of the second user, information indicating a context of the request from the first user, and a session token, wherein the authorization request is communicated to the device of the second user as a push message;

communicating, by the server, the authorization request to the device of the second user via a push notification;

receiving, by the server, in response to the authorization request, information related to consent by the second user for the first user to perform the activity;

communicating, by the server, an authorization code related to the consent, the authorization code being sent to the device of the second user, the first user and the electronic entity;

delegating authority, by the server, to the first user to act as an authorized user of the account credential information of the second user for the electronic activity; and facilitating, by the server, the electronic activity based on the delegated authority via an access token accessible using the authorization code.

15. The non-transitory computer-readable medium of claim 14, further comprising:

creating, by the server, an authorization code based on the consent information;

compiling, by the server, a message comprising the authorization code and a redirection message to the account of the second user;

performing, by the server, a token request call to a token endpoint based on the compiled message, the token endpoint comprising access tokens for enabling authority delegation of the account credential information of the second user to the first user; and identifying, by the server, an access token, wherein the access token enables the authority delegation to the first user.

16. The non-transitory computer-readable medium of claim 14, further comprising:

receiving, by the server, information identifying the second user and a context of the request from the first user, the context comprising information indicating the activity of the first user, the information identifying the second user comprises a Mobile Directory Number (MDN) of the second user; and performing the compilation of the authorization request based on the received information.

17. The non-transitory computer-readable medium of claim 14, further comprising:

identifying, by the server, a successful login to the account of the second user by the second user, wherein the consent information is enabled to be received based on the successful login.

* * * * *